(12) United States Patent
Kim et al.

(10) Patent No.: US 8,823,603 B1
(45) Date of Patent: Sep. 2, 2014

(54) HEAD MOUNTED DISPLAY AND METHOD OF CONTROLLING THEREFOR

(71) Applicant: LG Electronics Inc., Seoul (KR)

(72) Inventors: Jihwan Kim, Seoul (KR); Doyoung Lee, Seoul (KR); Sinae Chun, Seoul (KR); Eunhyung Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/094,489

(22) Filed: Dec. 2, 2013

Related U.S. Application Data (60) Provisional application No. 61/858,623, filed on Jul. 26, 2013.

(30) Foreign Application Priority Data

Sep. 26, 2013 (KR) .......................... 10-2013-0114491

(51) Int. Cl.
```
G09G 5/00      (2006.01)
G06F 3/01      (2006.01)
G02B 27/01     (2006.01)
G06F 3/0354    (2013.01)
```

(52) U.S. Cl.
CPC .............. *G06F 3/012* (2013.01); *G02B 27/017* (2013.01); *G06F 3/03547* (2013.01)
USPC ................................ 345/8; 345/156; 345/173

(58) Field of Classification Search
CPC . G06F 3/04883; G06F 3/03547; G06F 1/163; G02B 27/017; G02B 27/0176
USPC .................................................. 345/173, 8, 7
See application file for complete search history.

(56) References Cited

U.S. PATENT DOCUMENTS

| | | | |
|---|---|---|---|
| 6,349,001 B1* | 2/2002 | Spitzer ........................ | 359/618 |
| 8,120,590 B2* | 2/2012 | Lee .............................. | 345/173 |
| 2006/0061544 A1 | 3/2006 | Min et al. | |
| 2007/0009119 A1* | 1/2007 | Kim ............................ | 381/306 |
| 2007/0052672 A1* | 3/2007 | Ritter et al. .................. | 345/156 |
| 2007/0136064 A1* | 6/2007 | Carroll ........................ | 704/254 |
| 2007/0222767 A1* | 9/2007 | Wang .......................... | 345/173 |
| 2007/0236468 A1* | 10/2007 | Tuli ............................. | 345/173 |
| 2008/0130910 A1* | 6/2008 | Jobling et al. ................ | 381/74 |
| 2010/0033438 A1* | 2/2010 | Fu et al. ...................... | 345/173 |

(Continued)

FOREIGN PATENT DOCUMENTS

| | | |
|---|---|---|
| JP | 11-75140 A | 3/1999 |
| JP | 2005-70308 A | 3/2005 |
| JP | 2009-253786 A | 10/2009 |

*Primary Examiner* — Dorothy Harris
(74) *Attorney, Agent, or Firm* — Birch, Stewart, Kolasch & Birch, LLP (57) ABSTRACT

A method of controlling a head mounted display (HMD) according to one embodiment of the present specification includes the steps of outputting visual information via a display unit, outputting auditory information via an audio output unit, detecting a control input touching a first region or a second region of a temple of the HMD, if the control input is detected in the first region, setting the visual information as control target information, if the control input is detected in the second region, setting the auditory information as the control target information, and controlling an output of the set control target information according to an attribute of moving of the control input, which moves in the first region and the second region while maintaining a contact with the temple of the HMD.

16 Claims, 9 Drawing Sheets

(56) References Cited

U.S. PATENT DOCUMENTS

| | | | |
|---|---|---|---|
| 2011/0194029 A1* | 8/2011 | Herrmann et al. | 348/569 |
| 2012/0056847 A1 | 3/2012 | Milford | |
| 2012/0299870 A1 | 11/2012 | Chi et al. | |
| 2013/0176626 A1* | 7/2013 | Heinrich et al. | 359/630 |
| 2013/0307790 A1* | 11/2013 | Konttori et al. | 345/173 |

* cited by examiner

Visual Information only

Auditory Information only

HEAD MOUNTED DISPLAY AND METHOD OF CONTROLLING THEREFOR

Pursuant to 35 U.S.C. §119(a), this application claims the benefit of earlier filing date and right of priority to Korean Patent Application No. 10-2013-0114491, filed on Sep. 26, 2013, the contents of which are hereby incorporated by reference herein in their entirety.

Pursuant to 35 U.S.C. §119(e), this application also claims the benefit of U.S. Provisional Application Ser. No. 61/858,623, filed on Jul. 26, 2013, the contents of which are hereby incorporated by reference in their entirety

BACKGROUND OF THE INVENTION

1. Field of the Invention

The present specification relates to a head mounted display, and more particularly, to a head mounted display for controlling an output of visual information and auditory information according to a position to which a control input is inputted.

2. Discussion of the Related Art

As a head mounted display has been lightened, users can wear the head mounted display like glasses. Users can receive digital information using the head mounted display. The digital information can include visual information and auditory information. While receiving the visual information and the auditory information using a head mounted display, users can control the visual information and the auditory information according to a situation.

Since it is difficult for a head mounted display to be equipped with various buttons on a surface of the head mounted display, the head mounted display may have low operability due to an attribute of the device. Hence, in case of watching the digital information using a head mounted display, a method of controlling the visual information and the auditory information via a simple operation is required. In particular, due to lightening and miniaturization, it is difficult for a head mounted display to provide a sufficient touch sensitive space to control each of the informations. Hence, the head mounted display selects control target information first and then should provide a method of controlling the selected control target information.

SUMMARY OF THE INVENTION

Accordingly, the present specification is directed to an apparatus and method thereof that substantially obviate one or more problems due to limitations and disadvantages of the related art.

An object of the present specification is to provide a head mounted display for activating or inactivating an audio input/output unit or a display unit according to a mode of wearing and a method of controlling therefor. In particular, according to the present specification, it is necessary for the head mounted display to provide a method of determining which information is to be set/controlled as control target information among visual information and auditory information according to a region in which a control input is detected.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a head mounted display (HMD) includes a display unit configured to output visual information, an audio output unit configured to output auditory information, a sensor unit configured to detect a control input in a manner of being positioned at a temple of the HMD, and if the control input is detected in a first region of the sensor unit, a controller configured to control an output of the visual information, if the control input is detected in a second region of the sensor unit, the controller configured to control an output of the auditory information, the controller configured to set control target information according to a region in which the control input is detected among the first region or the second region, the controller configured to control an output of the set control target information according to an attribute of moving of the control input, which moves in the first region and the second region while maintaining a contact with the sensor unit, if the contact between the control input and the sensor unit is released, the controller configured to terminate a control for the output of the set control target information, wherein the first region corresponds to a region adjacent to the display unit of the temple and wherein the second region corresponds to a region adjacent to the audio output unit of the temple.

To further achieve these objects and other advantages and in accordance with the purpose of the invention, as embodied and broadly described herein, a method of controlling a head mounted display (HMD) according to one embodiment of the present specification includes the steps of outputting visual information via a display unit, outputting auditory information via an audio output unit, detecting a control input touching a first region or a second region of a temple of the HMD, if the control input is detected in the first region, setting the visual information as control target information, if the control input is detected in the second region, setting the auditory information as the control target information, controlling an output of the set control target information according to an attribute of moving of the control input, which moves in the first region and the second region while maintaining a contact with the temple of the HMD, and if the contact between the control input and the temple of the HMD is released, terminating a control for the output of the set control target information, wherein the first region corresponds to a region adjacent to the display unit of the temple and wherein the second region corresponds to a region adjacent to the audio output unit of the temple.

According to the present specification, a head mounted display can select/control control target information according to a position where a control input is detected on a sensor unit.

According to the present specification, a head mounted display can divide a detecting region of a sensor unit into a visual information control region and an auditory information control region.

According to the present specification, if a control input is detected in a visual information control region, a head mounted display can switch an auditory information control region to the visual information control region while a contact of the control input is maintained.

According to the present specification, if a control input is detected in an auditory information control region, a head mounted display can switch a video information control region to the auditory information control region while a contact of the control input is maintained.

According to the present specification, if control target information is determined, a head mounted display can provide a control interface corresponding to the control target information as a tactile feedback.

According to the present specification, if outputted information includes auditory information only, a head mounted display can switch a video information control region to an auditory information control region.

According to the present specification, if outputted information includes visual information only, a head mounted display can switch an auditory information control region to a visual information control region.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

While the embodiments have been concretely described with reference to the attached diagrams and the contents written on the diagrams, a scope of claims may be non-restricted or non-limited to the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

In the present specification, a head mounted display may include a wearable device capable of displaying visual information in a manner of being worn on a body of a user.

Figure 1:
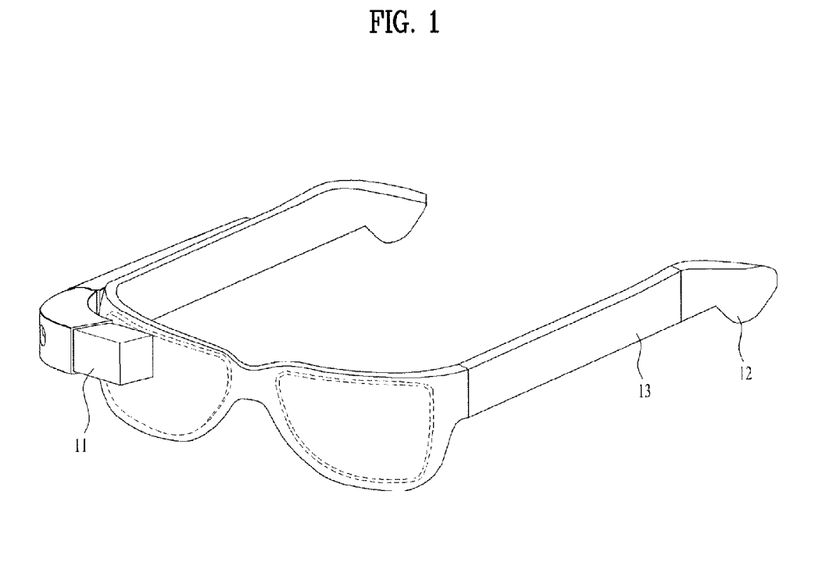
FIG. 1 is a diagram of a head mounted display (HMD) according to one embodiment of the present specification.

FIG. 1 is a diagram of a head mounted display (HMD) according to one embodiment of the present specification. Referring to FIG. 1, a head mounted display (hereinafter abbreviated HMD) can be divided into a plurality of parts. In FIG. 1, the HMD can include a display part 11, an ear piece part 12, and a temple part 13. The display part 11 can include a display unit, displays a digital image, and can provide a user with visual information. As depicted in FIG. 1, the display part 11 may have such a form as a rim of glasses. The display part 11 can include a display unit configured to project or display visual information. According to a different embodiment, the HMD may include a display unit and a frame supporting the display unit except the rim.

The ear piece part 12 can fix an HMD to ears of a user. The ear piece part 12 may include an audio output unit and the audio output unit can output auditory information. The audio output unit may include a speaker or a bone conduction speaker.

The temple part 13 can fix an HMD to a head of a user. The temple part 13 can include a touch sensor unit on an external surface of the temple part. The touch sensor unit included in the temple part can be divided into a plurality of regions. A plurality of the regions of the touch sensor unit can be divided into a region for controlling visual information displayed in the HMD and a region for controlling auditory information outputted from the HMD, respectively. Regarding this, it shall be described in detail in FIG. 2.

Figure 2:
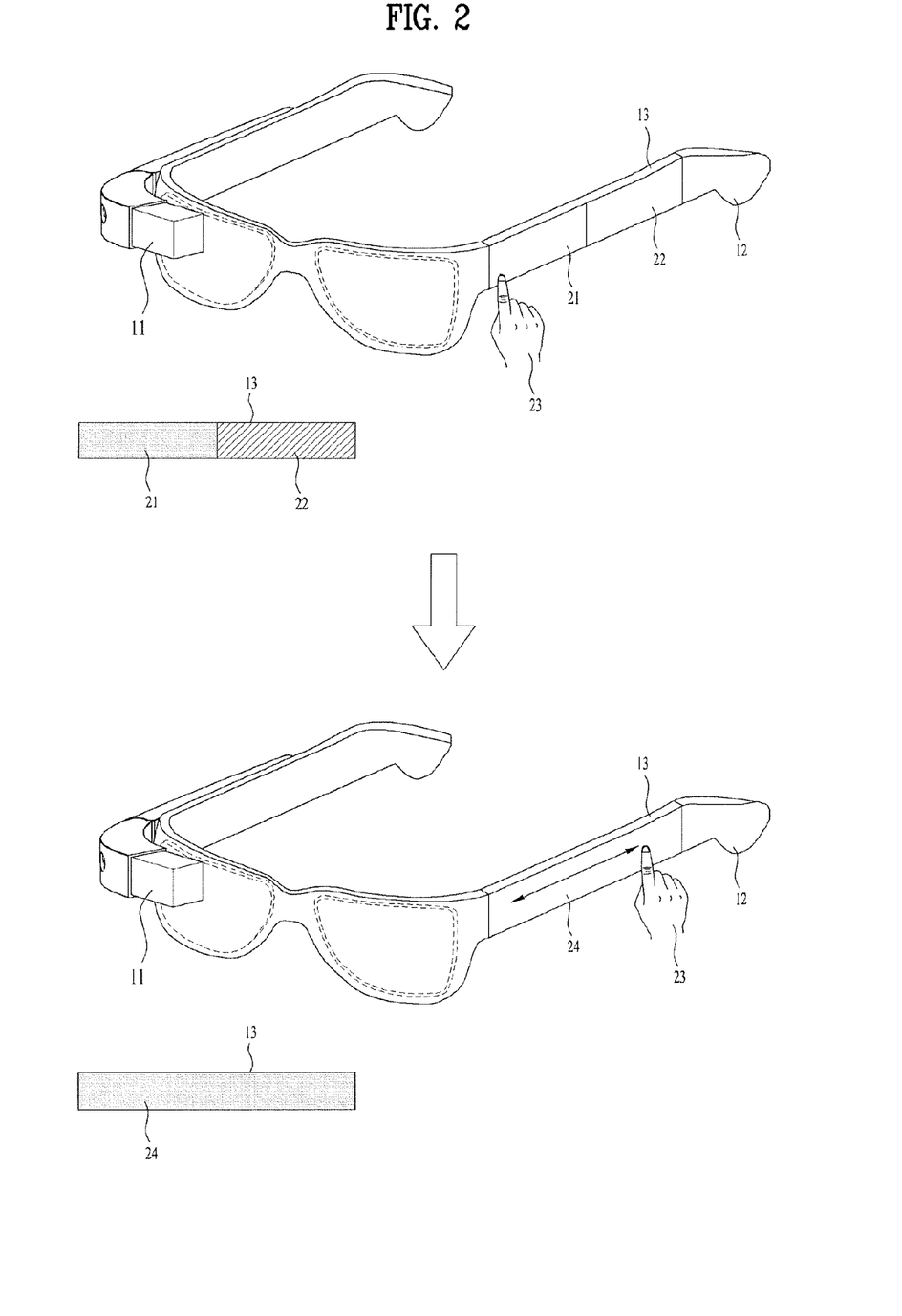
FIG. 2 is a diagram for a method of controlling visual information of an HMD according to one embodiment of the present specification.

FIG. 2 is a diagram for a method of controlling visual information of an HMD according to one embodiment of the present specification. Referring to the top of FIG. 2, the HMD can include a display part 11, an ear piece part 12, and a temple part 13. The temple part 13 of the HMD can include a sensor unit and the sensor unit may include a touch sensitive region. The HMD can include a touch sensitive region divided into a plurality of regions in the temple part 13. The HMD can divide the touch sensitive region into a first region 21 and a second region 22. In this case, the first region 21 and the second region 22 may be adjacent to each other.

The HMD can control an output of visual information based on a control input detected in the first region 21. The HMD can set a region adjacent to the display part 11 among the temple part 13 as the first region 21. And, the HMD can control an output of auditory information based on a control input detected in the second region 22. The HMD can set a region adjacent to the ear piece part 12 among the temple part 13 as the second region 22.

As depicted in the top of FIG. 2, the HMD can generate a tactile feedback on a surface of the temple part 13 divided into the first region 21 and the second region 22. The HMD generates a first tactile feedback in the first region 21 and can generate a second tactile feedback in the second region 22. A user touching the temple part 13 of the HMD can be provided with the first tactile feedback or the second tactile feedback from the HMD. Hence, when the user touches a region, the user can distinguish the first region 21 from the second region 22 in a manner of receiving the first tactile feedback or the second tactile feedback. In particular, the HMD can inform the user of whether the user controls visual information or auditory information in a manner of dividing the region where the first tactile feedback and the second tactile feedback are generated into the first region and the second region, respectively.

In order to control an output of visual information of the HMD, a user can input a control input 23 to the first region 21. In this case, the control input can include a touch input. The HMD can detect the control input 23 in the first region 21. For instance, the HMD can detect the control input 23 contacted with a touch sensitive region. If the control input 23 is detected in the first region 21, the HMD can configure visual information as control target information. The HMD can control the visual information set as the control target information in response to the control input 23. And, the HMD can generate the first tactile feedback in the first region 21 in response to the control input 23.

Having detected the control input in the first region 21, the HMD can set the touch sensitive region of the temple part as the first region 21 as depicted in the bottom of FIG. 2. Unlike the HMD, which has divided the touch sensitive region of the temple part 13 into the first region 21 and the second region 22 as depicted in the top of FIG. 2, if the control input 23 is detected in the first region 21, the HMD can set the touch sensitive region of the temple part 13 as the first region 21. Since the touch sensitive region of the temple part 13 has a limited space, the first region 21 selected by a user can be extended to the whole region of the touch sensitive region of the temple part 13 to enhance operability of a user. In the present specification, the first region extended to the whole region of the touch sensitive region can be defined as an 'extended first region' 24.

As depicted in the bottom of FIG. 2, the HMD can detect a control input 23 moving within the extended first region 24. While a first contact between the control input 23 and the extended first region 24 is maintained, the HMD can maintain visual information as control target information. Hence, the HMD can control the visual information according to the control input 23 moving within the extended first region 24 while the first contact is maintained.

And, while the first contact between the control input 23 and the extended first region 24 is maintained, the HMD can maintain the extended first region 24. If the first contact is released, the HMD can reset the extended first region 24 as the first region 21 and the second region 22.

As depicted in the bottom left of FIG. 2, the HMD can generate a first tactile feedback on a surface of the temple 13 set as the extended first region 24. In particular, the HMD can generate the first tactile feedback in both the first region 21 and the second region 22 in which the first tactile feedback and the second tactile feedback are used to be generated, respectively, in the top left of FIG. 2. While the first contact between the control input 23 and the extended first region 24 is maintained, the HMD can maintain the first tactile feedback in the extended first region 24.

A user controlling visual information by touching a touch sensitive region of the temple part 13 of the HMD can be provided with the first tactile feedback wherever the user touches in the touch sensitive region. The user recognizes the first tactile feedback and may be then able to confirm that control target information controlled by the user is visual information.

Figure 3:
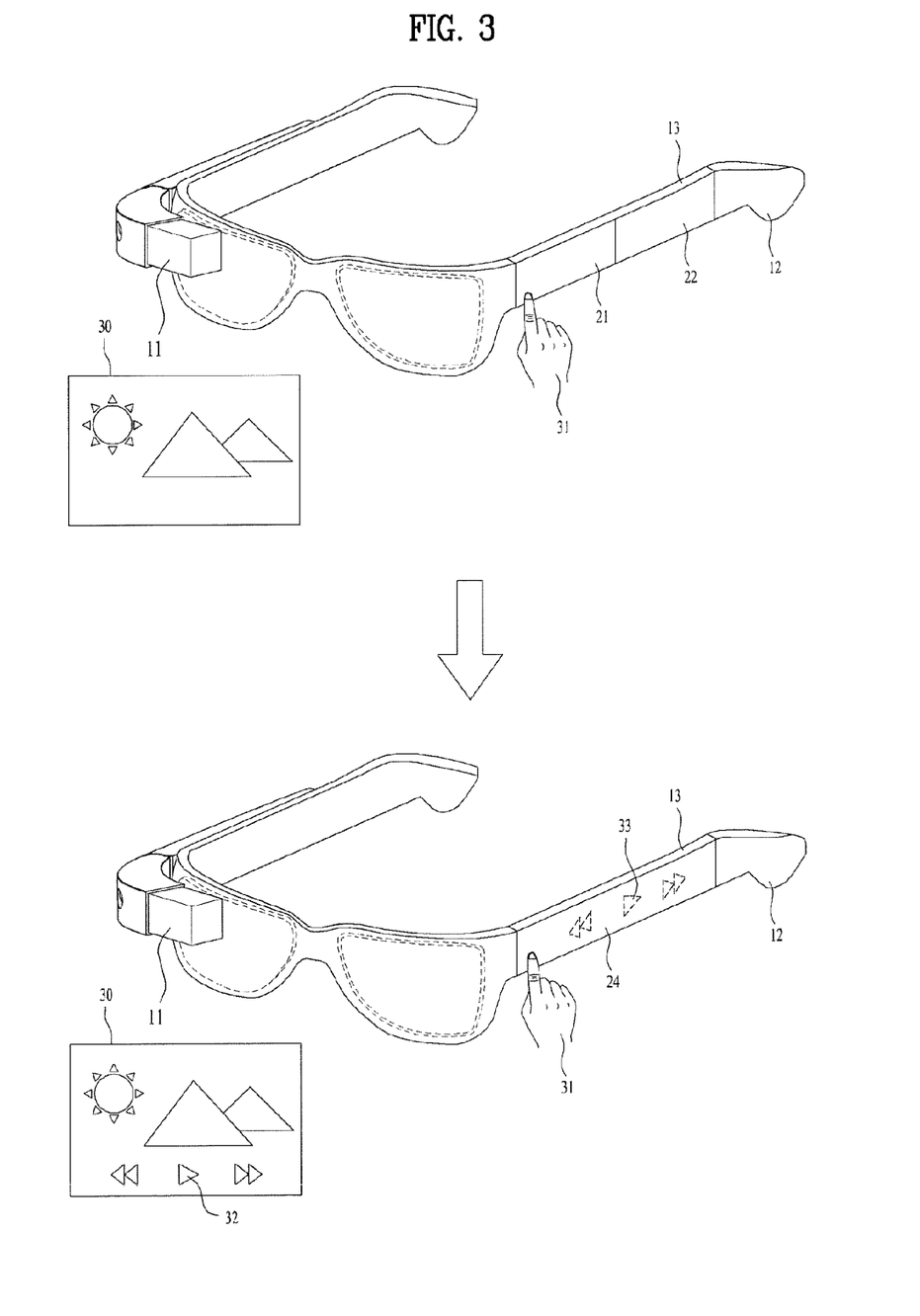
FIG. 3 is a diagram of a control interface for visual information of an HMD according to one embodiment of the present specification.

FIG. 3 is a diagram of a control interface for visual information of an HMD according to one embodiment of the present specification. Referring to the top of FIG. 3, the HMD can display visual information using the display unit included in the display part 11. The visual information 30 displayed by the HMD can include a video, a picture, a notification, an application execution screen, or a video call image. The HMD can divide a touch sensitive region of the temple part 13 into a first region 21 and a second region 22. The HMD can detect a control input 31 touching the first region 21. The HMD can set visual information as control target information in response to the control input 31 detected in the first region 21.

As depicted in the bottom of FIG. 3, having set the visual information as the control target information, the HMD can set a touch sensitive region of the temple part as an extended first region 24. The HMD can control the visual information in response to the control input 31 detected in the extended first region 24.

And, having set the visual information as the control target information, the HMD can display a control interface 32 for the visual information in addition to the visual information 30 displayed in the display unit. For instance, the HMD can display a playback menu configured to control a video. The control interface 32 for the visual information can include an interface configured to control a menu, movement, a size, a position, and a playback of the visual information. The HMD can control at least one of a menu, movement, a size, a position, and a playback of the displayed visual information using the interface.

The HMD can generate a tactile feedback of the control interface 32 for the displayed visual information. The HMD can provide a tactile interface 33 corresponding to the displayed visual information or the control interface 32 to the touch sensitive region. The HMD detects a control input on the tactile interface 33 and can execute a function corresponding to the tactile interface 33. For instance, the HMD can provide a playback menu as the tactile interface. If a user touches the tactile interface, the HMD can control a playback of visual information.

The HMD can provide a tactile interface to a touch sensitive region of the temple part 13 in response to an attribute of the displayed visual information. The HMD can generate a tactile feedback in response to an attribute of the visual information. In this case, the attribute of the visual information can include at least one of a shape, a position, a size, and a texture of the visual information.

Figure 4:
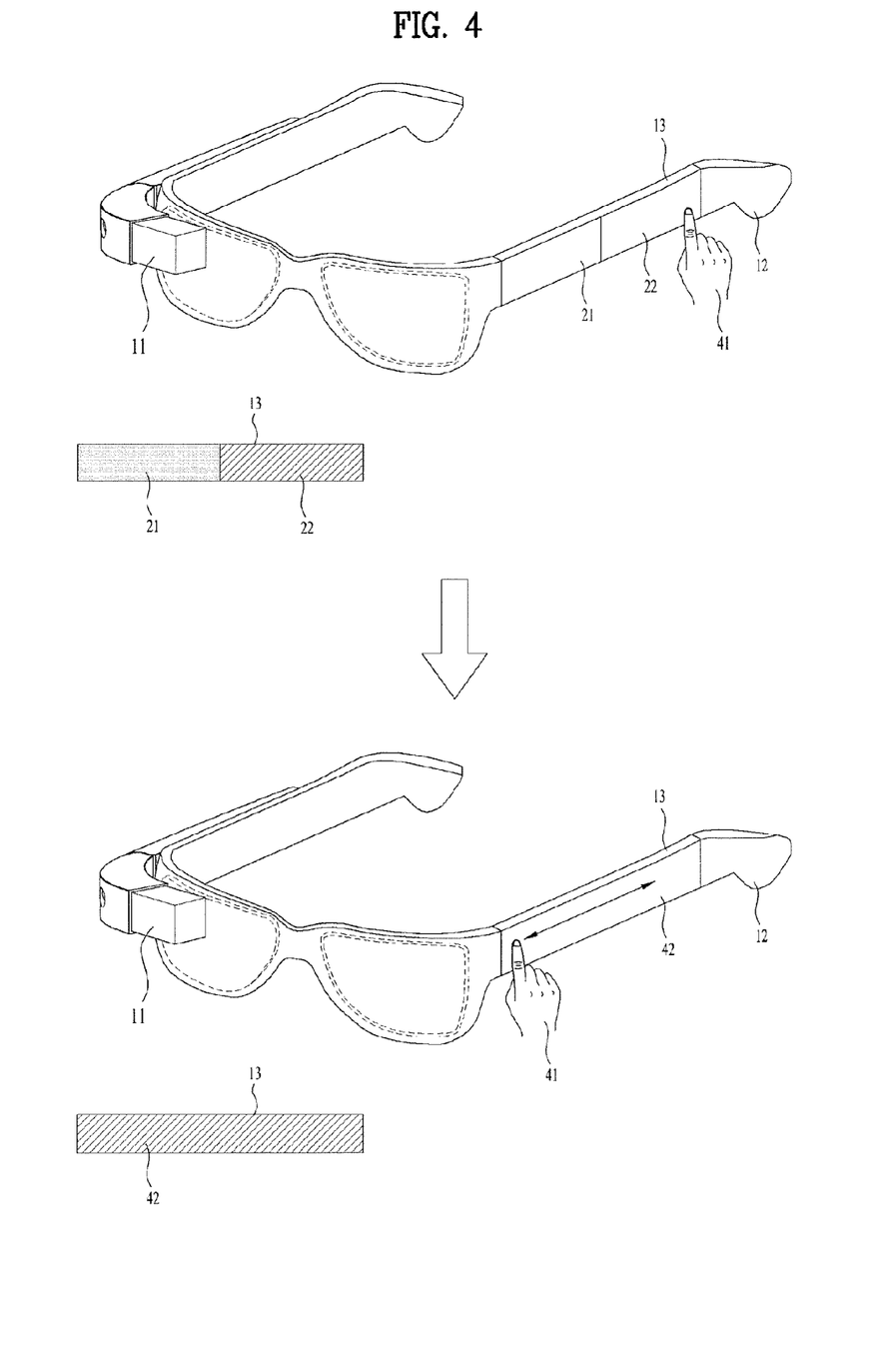
FIG. 4 is a diagram for a method of controlling auditory information of an HMD according to one embodiment of the present specification.

FIG. 4 is a diagram for a method of controlling auditory information of an HMD according to one embodiment of the present specification. Referring to the top of FIG. 4, the HMD can include a display part 11, an ear piece part 12, and a temple part 13. The temple part 13 of the HMD can include a sensor unit and the sensor unit may include a touch sensitive region. The HMD can include a touch sensitive region divided into a plurality of regions in the temple part 13.

The HMD can divide the touch sensitive region into a first region 21 and a second region 22. The HMD can control an output of visual information based on a control input detected on the first region 21. The HMD can set a region adjacent to the display part 11 of the temple part 13 as the first region 21. And, the HMD can control an output of auditory information based on a control input detected in the second region 22. The HMD can set a region adjacent to the ear piece part 12 of the temple part 13 as the second region 22.

As depicted in the top left of FIG. 4, the HMD can generate a tactile feedback on a surface of the temple part 13 divided into the first region 21 and the second region 22. The HMD generates a first tactile feedback in the first region 21 and can generate a second tactile feedback in the second region 22. A user touching the temple part 13 of the HMD can be provided with the first tactile feedback or the second tactile feedback from the HMD. Hence, when the user touches a region, the user can distinguish the first region 21 from the second region 22 in a manner of receiving the first tactile feedback or the second tactile feedback. In particular, the HMD can inform the user of whether the user controls visual information or auditory information in a manner of dividing the region where the first tactile feedback and the second tactile feedback are generated into the first region and the second region, respectively.

In order to control an output of auditory information of the HMD, a user can input a control input 41 to the second region 22. In this case, the control input can include a touch input. The HMD can detect the control input 41 in the second region 22. For instance, the HMD can detect the control input 41 contacted with a touch sensitive region. If the control input 41 is detected in the second region 22, the HMD can set auditory information as control target information. The HMD can control the auditory information set as the control target information in response to the control input 41. And, the HMD can generate the second tactile feedback in the second region 22 in response to the control input 41.

Having detected the control input in the second region 22, the HMD can set the touch sensitive region of the temple part as the second region 22 as depicted in the bottom of FIG. 4. Unlike the HMD, which has divided the touch sensitive region of the temple part 13 into the first region 21 and the second region 22 as depicted in the top of FIG. 4, if the control input 41 is detected in the second region 22, the HMD can set the touch sensitive region of the temple part 13 as the second region 22. Since the touch sensitive region of the temple part 13 has a limited space, the second region 22 selected by a user can be extended to the whole region of the touch sensitive region of the temple part 13 to enhance operability of a user. In the present specification, the second region extended to the whole region of the touch sensitive region can be defined as an 'extended second region' 42.

As depicted in the bottom of FIG. 4, the HMD can detect a control input 41 moving within the extended second region 42. While a second contact between the control input 41 and the extended second region 42 is maintained, the HMD can maintain auditory information as control target information. Hence, the HMD can control the auditory information according to the control input 41 moving within the extended second region 42 while the second contact is maintained.

And, while the second contact between the control input 41 and the extended second region 42 is maintained, the HMD can maintain the extended second region 42. If the second contact is released, the HMD can reestablish the extended second region 42 as the first region 21 and the second region 22.

As depicted in the bottom left of FIG. 4, the HMD can generate a second tactile feedback on a surface of the temple 13 set as the second region 42. In particular, the HMD can generate the second tactile feedback in both the first region 21 and the second region 22 in which the first tactile feedback and the second tactile feedback are used to be generated, respectively, in the top left of FIG. 4. While the second contact between the control input 41 and the extended second region 42 is maintained, the HMD can maintain the second tactile feedback in the extended second region 42.

A user controlling auditory information by touching a touch sensitive region of the temple part 13 of the HMD can be provided with the second tactile feedback wherever the user touches in the touch sensitive region. The user recognizes the second tactile feedback and may be then able to confirm that control target information controlled by the user is auditory information.

Figure 5:
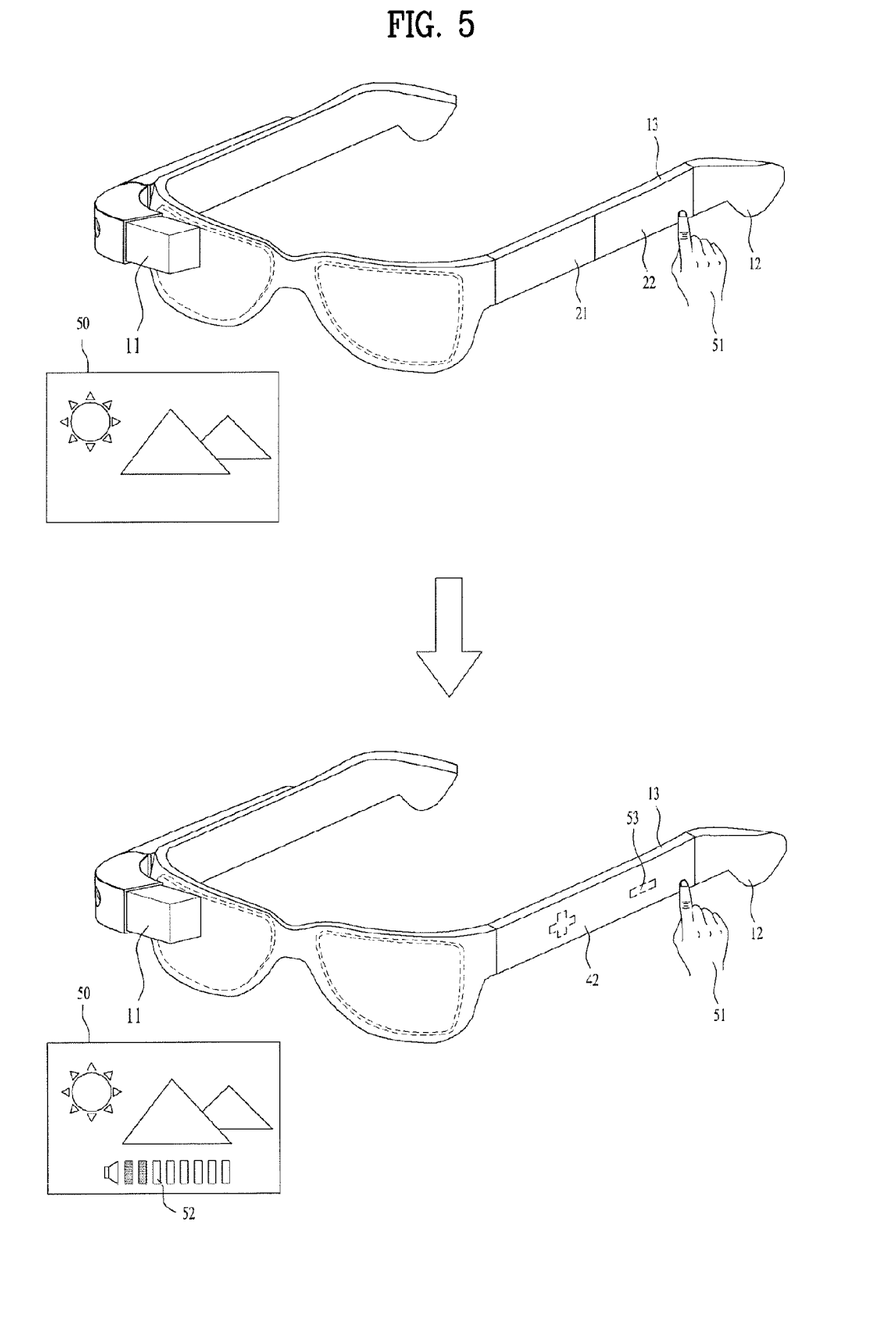
FIG. 5 is a diagram of a control interface for auditory information of an HMD according to one embodiment of the present specification.

FIG. 5 is a diagram of a control interface for auditory information of an HMD according to one embodiment of the present specification. Referring to the top of FIG. 5, the HMD can output auditory information using the audio output unit included in the ear piece part 12. The auditory information outputted by the HMD can include music, alarm, a voice of the other party in case of a voice call, a notification sound. The HMD can divide a touch sensitive region of the temple part 13 into a first region 21 and a second region 22. The HMD can detect a control input 51 touching the second region 22. The HMD can set auditory information as control target information in response to the control input 51 detected in the second region 22.

As depicted in the bottom of FIG. 4, having set the auditory information as the control target information, the HMD can set a touch sensitive region of the temple part as an extended second region 42. The HMD can control the auditory information in response to the control input 51 detected in the extended second region 42.

And, having set the auditory information as the control target information, the HMD can display a control interface 52 for the auditory information in addition to the visual information 50 displayed in the display unit. For instance, the HMD can display a volume control menu configured to control a volume of the auditory information. The control interface 52 for the auditory information can include an interface configured to control a volume, balance, and a playback of the auditory information. The HMD can control at least one of a volume, balance, and a playback of the displayed auditory information using the interface.

The HMD can generate a tactile feedback of the control interface 52 for the outputted auditory information. The HMD can provide a tactile interface 53 corresponding to the outputted auditory information or the control interface 52 to the touch sensitive region. The HMD detects a control input on the tactile interface 53 and can execute a function corresponding to the tactile interface 53. For instance, the HMD can provide a volume control menu as the tactile interface. If a user touches the tactile interface, the HMD can control a volume of the auditory information.

The HMD can provide a tactile interface to a touch sensitive region of the temple part 13 in response to an attribute of the outputted auditory information. The HMD can generate a tactile feedback in response to an attribute of the auditory information. In this case, the attribute of the visual information can include at least one of a tempo and a volume of the auditory information.

Figure 6:
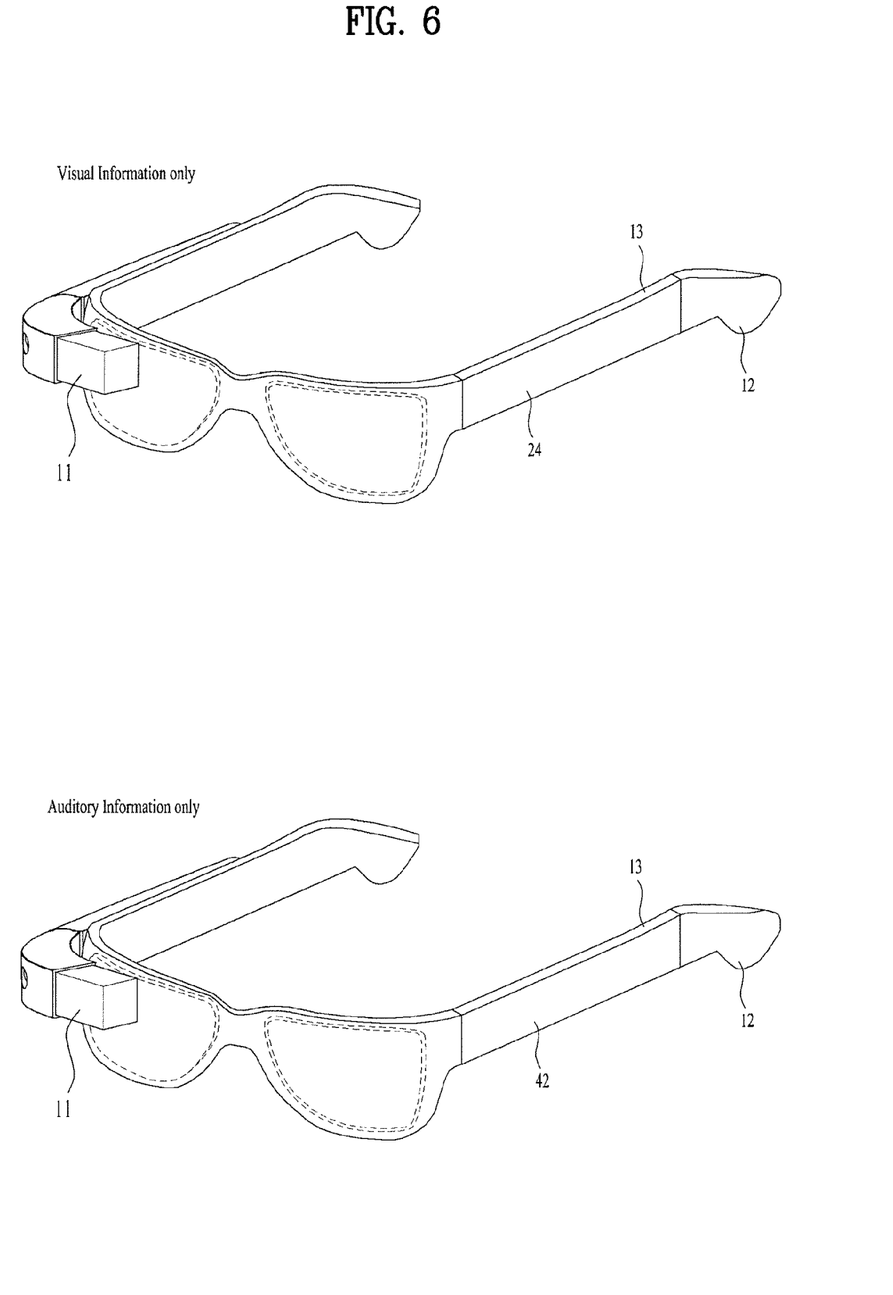
FIG. 6 is a diagram of a method of configuring a control target information in response to an output information of an HMD according to one embodiment of the present specification.

FIG. 6 is a diagram of a method of configuring control target information in response to output information of an HMD according to one embodiment of the present specification. The HMD can set the control target information according to the information outputted from the HMD. The HMD can set the control target information set according to a control input detected in the touch sensitive region of the temple part 13. If the outputted information includes visual information only, the HMD can set the visual information as the control target information. The HMD can control the visual information according to the control input detected in the touch sensitive region. In particular, the HMD sets the touch sensitive region of the temple as an extended first region 24 and can use a control input detected in the extended first region 24 to control the visual information. Unlike this, if the outputted information includes auditory information only, the HMD can set the auditory information as the control target information. The HMD can control the auditory information according to the control input detected in the touch sensitive region. In particular, the HMD sets the touch sensitive region of the temple as an extended second region 42 and can use a control input detected in the extended second region 42 to control the auditory information.

Referring to the top of FIG. 6, the HMD can output visual information only. For instance, the HMD can display an e-mail or a picture. In this case, since the HMD does not output auditory information to be controlled, the HMD can set the visual information as the control target information. And, the HMD can set the touch sensitive region of the temple part 13 as an extended first region 24 to detect a control input for controlling an output of the visual information. In particular, the HMD can detect the control input configured to control the output of the visual information in the whole region of the touch sensitive region of the temple part 13.

The above-mentioned may include a case that the HMD outputs one-time auditory information together with visual information. For instance, in case that the HMD displays a navigation menu or a notification along with one-time sound, the HMD can operate as mentioned in the foregoing description.

Referring to the bottom of FIG. 6, the HMD can output auditory information only. For instance, the HMD can play music or output a voice of the other party in case of performing a voice call. In this case, since the HMD does not display visual information to be controlled, the HMD can set the auditory information as the control target information. And, the HMD can set the touch sensitive region of the temple part 13 as an extended second region 42 to detect a control input for controlling an output of the auditory information. In particular, the HMD can detect the control input configured to control the output of the auditory information in the whole region of the touch sensitive region of the temple part 13.

The above-mentioned may include a case that the HMD outputs one-time visual information together with auditory information. For instance, in case that the HMD displays an image of a corresponding album while playing a music album or in case that the HMD displays information on the other party while performing a voice call, the HMD can operate as mentioned in the foregoing description.

Figure 7:
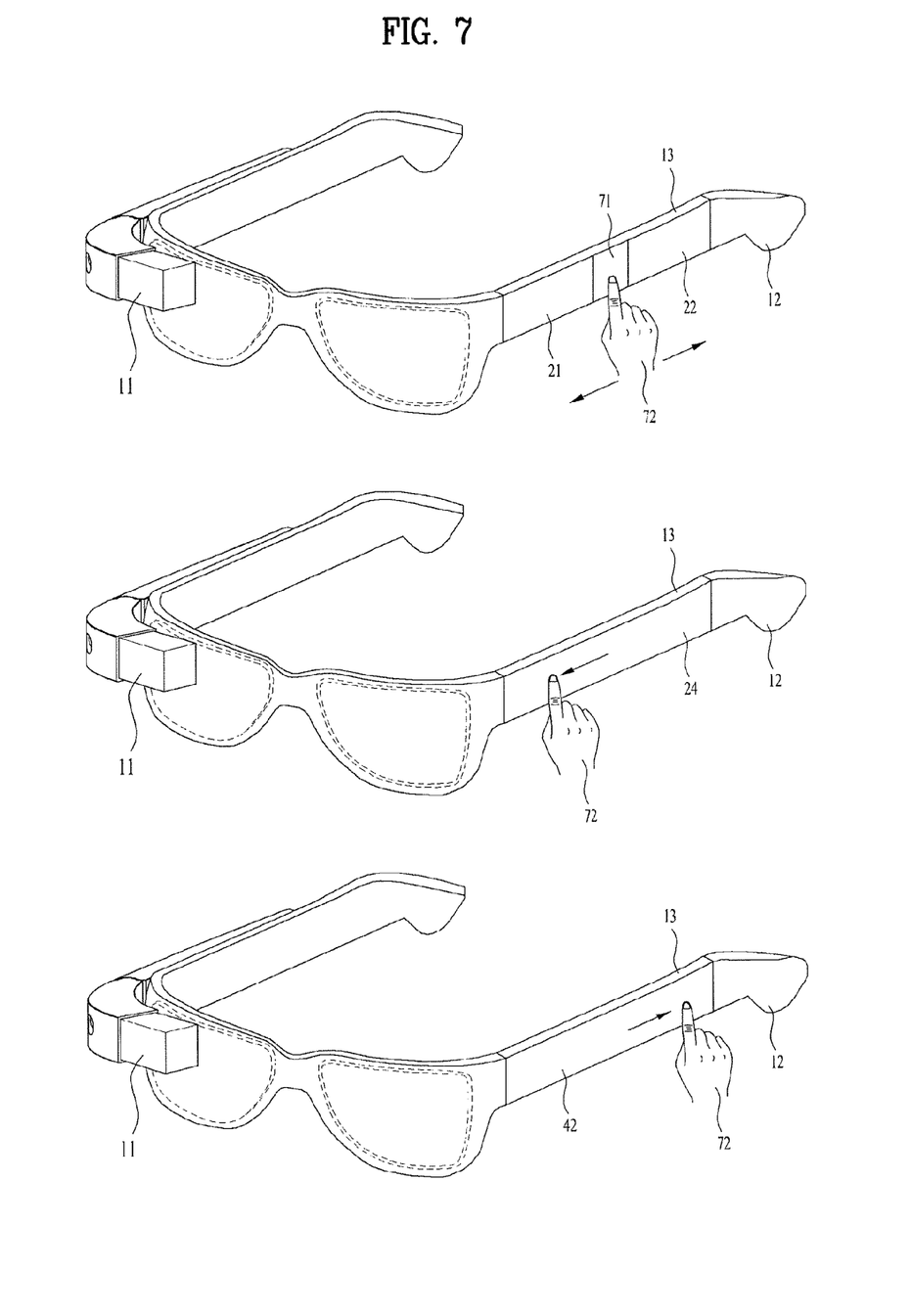
FIG. 7 is a diagram of a method of determining a control target information of an HMD according to one embodiment of the present specification.

FIG. 7 is a diagram of a method of determining control target information of an HMD according to one embodiment of the present specification. The HMD can divide the touch sensitive region into a first region 21, a second region 22, and a third region 71. The HMD can include the third region 71 between the first region 21 and the second region 22. The HMD can control an output of visual information based on a detected control input in the first region 21. The HMD can set a region adjacent to the display part 11 of the temple part 13 as the first region 21. And, the HMD can control an output of auditory information based on a control input detected in the second region 22. The HMD can set a region adjacent to the ear piece part 12 of the temple part 13 as the second region 22. And, if a control input is detected in the third region 71, the HMD can set the control target information based on a moving direction of the control input. If a control input is detected in the third region 71, the HMD can differently operate according to whether a user interface configured to set the control target information is displayed.

If a control input 72 is detected in the third region, the HMD can display a user interface configured to select visual information or auditory information as the control target information. For instance, if the control input 72 moves to a first direction at which the display part 11 is positioned, the HMD can display that an output of the visual information is controlled. If the control input 72 moves to a second direction at which the ear piece part 12 is positioned, the HMD can display that an output of the auditory information is controlled. If the control input moves to the first direction at which the first region is positioned while maintaining a contact with the touch sensitive region, the HMD can set the visual information as the control target information. In particular, the HMD can set the touch sensitive region of the temple part 13 as an extended first region 24 in response to the control input, which has contacted the third region 71 and moved to the first direction. Hence, the HMD can provide the extended first region 24 to a user before the contact between the control input and the temple is released. In other word, while the contact between the control input and the touch sensitive region is maintained, the HMD can control the output of the visual information, which is the control target information, in response to the control input 72 that moves in the first region, the second region, and the third region.

If a control input moves to a second direction at which a second region 22 is positioned while maintaining a contact with the touch sensitive region, the HMD can set auditory information as control target information. In particular, the HMD can set the touch sensitive region of the temple part 13 as an extended second region 42 in response to the control input, which has contacted the third region 71 and moved to the second direction. Hence, the HMD can provide the extended second region 42 to a user before the contact between the control input and the temple is released. In other word, while the contact between the control input and the touch sensitive region is maintained, the HMD can control the output of the auditory information, which is the control target information, in response to the control input 72 that moves in the first region, the second region, and the third region.

Although the control input 72 is detected in the third region, the HMD may not display a user interface configured to select visual information or auditory information as the control target information. In this case, the HMD can operate in a way different from the way depicted in FIG. 7. If a control input moves to a first direction at which a first region 21 is positioned while a contact with the touch sensitive region is maintained, the HMD can set auditory information as control target information. In particular, the HMD can set the touch sensitive region of the temple part 13 as an extended second region in response to the control input, which has contacted the third region 71 and moved to the first direction. Hence, the HMD can provide the extended second region to a user before the contact between the control input and the temple is released. In other word, while the contact between the control input and the touch sensitive region is maintained, the HMD can control the output of the auditory information, which is the control target information, in response to the control input 72 that moves in the first region, the second region, and the third region.

If a control input moves to a second direction at which a second region 22 is positioned while maintaining a contact with the touch sensitive region, the HMD can set visual information as control target information. In particular, the HMD can set the touch sensitive region of the temple part 13 as an extended first region in response to the control input, which has contacted the third region 71 and moved to the second direction. Hence, the HMD can provide the extended first region to a user before the contact between the control input and the temple is released. In other word, while the contact between the control input and the touch sensitive region is maintained, the HMD can control the output of the visual information, which is the control target information, in response to the control input 72 that moves in the first region, the second region, and the third region.

Figure 8:
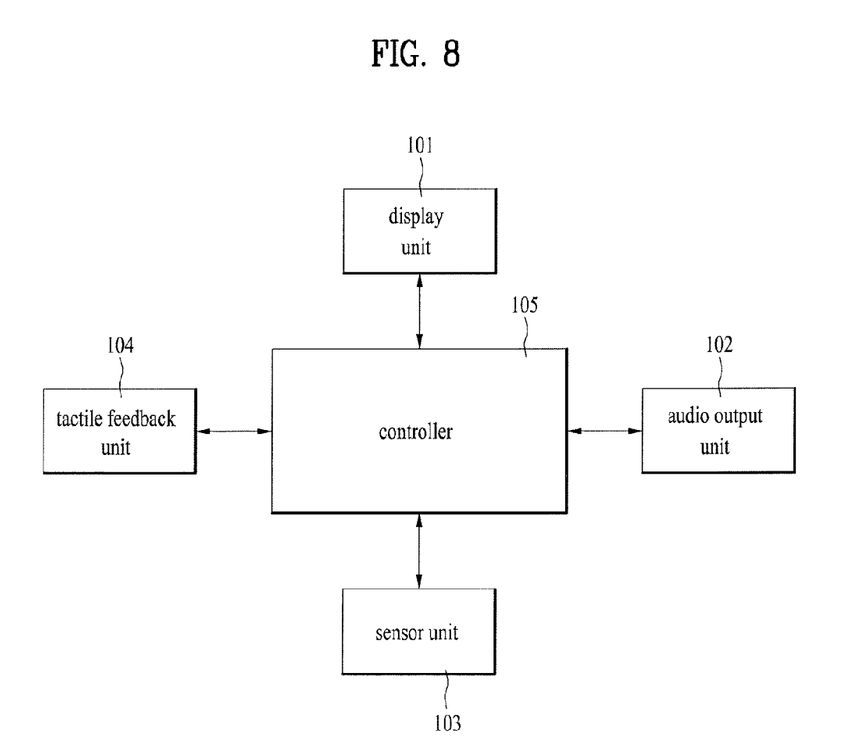
FIG. 8 is a block diagram of an HMD according to one embodiment of the present specification.

FIG. 8 is a block diagram of an HMD according to one embodiment of the present specification. The HMD can include a display unit 101, an audio output unit 102, a sensor unit 103, and a controller 105. According to embodiment, the HMD may further include a tactile feedback unit 104 in an optional configuration.

The display unit 101 can display visual information. The display unit 101 can display an image of the other party in case of performing a video call. And, the display unit 101 can display a picture or a digital content. The display unit can include a first display unit and a second display unit corresponding to a left eye and a right eye of a user, respectively. The display unit may further include a projector.

According to embodiment, the display unit 101 can include at least one selected from the group consisting of an organic light-emitting diode (OLED), a liquid crystal display (LCD), an e-ink, a projector, and a flexible display.

The HMD can include an audio output unit 102. The audio output unit can convert an electric signal to an audio signal and can output the audio signal. For instance, if the HMD performs a video call or a voice call, the audio output unit outputs a voice of the other party of the call and may be then able to deliver the voice to a user. And, the HMD can play music and can play a notification sound or an alarm sound. The HMD can include the audio output unit in an ear piece part or a temple part.

The sensor unit 103 can be positioned at the temple part and may include a touch sensitive region. The sensor unit 103 may include a first region to which a first control input controlling an output of visual information is inputted and a second region to which a second control input controlling an output of auditory information is inputted. According to embodiment, the sensor unit 103 may further include a third region located between the first region and the second region. The sensor unit 103 can detect a control input contacting each of the regions and detect whether a contact between a detected control input and the touch sensitive region is maintained. The sensor unit 103 can deliver information on the control input detected in each of the regions to the controller.

The tactile feedback unit 104 can generate a tactile feedback in response to a control input. The tactile feedback unit 104 can generate a tactile feedback in response to a type of information set as control target information. The tactile feedback unit 104 generates a first tactile feedback in the first region configured to detect a control input for visual information and may generate a second tactile feedback in the second region configured to detect a control input for auditory information among the touch sensitive region. If a control input detected in the first region moves to the second region while maintaining a contact with the touch sensitive region, the tactile feedback unit 104 can maintain the first tactile feedback for the first region and the second region. And, if a control input detected in the second region moves to the first region while maintaining a contact with the sensor unit, the tactile feedback unit 104 can maintain the second tactile feedback for the first region and the second region. And, the tactile feedback unit 104 can generate the first tactile feedback in response to an attribute of displayed visual information. In particular, the HMD can generate the first tactile feedback in response to at least one of a shape, a position, a size, and a texture of the visual information. And, the tactile feedback unit 104 can generate the second tactile feedback in response to an attribute of outputted auditory information. In particular, the HMD can generate the second tactile feedback in response to at least one of a tempo, a volume, and a rhythm of the auditory information.

A method of generating a tactile feedback, which is generated by the tactile feedback unit 104 to a user, is described in the following description. The tactile feedback unit 104 can deliver a tactile feedback to a finger of a user using a micro vibrating actuator or an ultrasonic vibration actuator. The tactile feedback unit 104 can control a vibration frequency and a vibration size. Hence, the tactile feedback unit can control the strength of the tactile feedback delivered to a finger of a user.

According to a different embodiment, the tactile feedback unit 104 can deliver a tactile feedback to a user by generating a micro current. The tactile feedback unit 104 can control the strength of a current and a generation period of a current. Hence, a user can feel a different tactile.

And, the tactile feedback unit 104 can generate a tactile feedback using an ultrasonic resonance. The tactile feedback unit 104 generates a plurality of ultrasonic waves and then makes a finger of a user resonate with a plurality of the ultrasonic waves to generate a tactile feedback. The tactile feedback unit 104 can generate a tactile feedback different from each other in a manner of controlling a size of a resonant frequency and a resonance generation period. The aforementioned display unit 101 and the tactile feedback unit can be designed in a manner of being integrated to a tactile display unit according to embodiment.

The controller 105 can control the display unit 101, the audio output unit 102, the sensor unit 103, and the tactile feedback unit 104 using information delivered from the sensor unit 103. The controller 105 can receive information on a contact of a control input from the sensor unit 103.

As mentioned earlier in FIG. 2 to FIG. 5, the controller 105 can set control target information according to a position where a control input is detected in the touch sensitive region of the temple part. And, the controller 105 can control an output of the control target information set according to a detected control input. The controller 105 can divide the touch sensitive region positioned at the temple part into a first region and a second region. The controller 105 can control an output of visual information based on a control input detected in the first region. The controller 105 can set a region adjacent to the display part of the temple part as the first region. And, the controller 105 can control an output of auditory information based on a control input detected in the second region. The controller 105 can set a region adjacent to the ear piece part of the temple part as the second region.

As mentioned earlier in FIG. 6, the controller 105 can set control target information according to outputted information. The controller 105 can set the control target information according to a control input detected in the touch sensitive region of the temple part. If outputted information includes visual information only, the controller 105 can set the visual information as the control target information. The controller 105 can control the visual information according to a control input detected in the touch sensitive region. Unlike this, if outputted information includes auditory information only, the controller 105 can set the auditory information as the control target information. The controller 105 can control the auditory information according to a control input detected in the touch sensitive region.

As mentioned earlier in FIG. 7, the controller 105 can divide the touch sensitive region into a first region, a second region, and a third region. The controller 105 can set the third region between the first region and the second region. If a control input is detected in the third region, the controller 105 can set control target information based on a moving direction of the control input. If a control input is detected in the third region, the controller 105 can operate differently according to whether a user interface configured to set the control target information is displayed.

FIG. 8 is a block diagram of an HMD according to one embodiment of the present specification. Blocks represented as being separated are depicted for elements of the HMD in a manner of being logically distinguished. Thus, the aforementioned elements of the HMD may be equipped with a single chip or a plurality of chips according to a design of the HMD.

Figure 9:
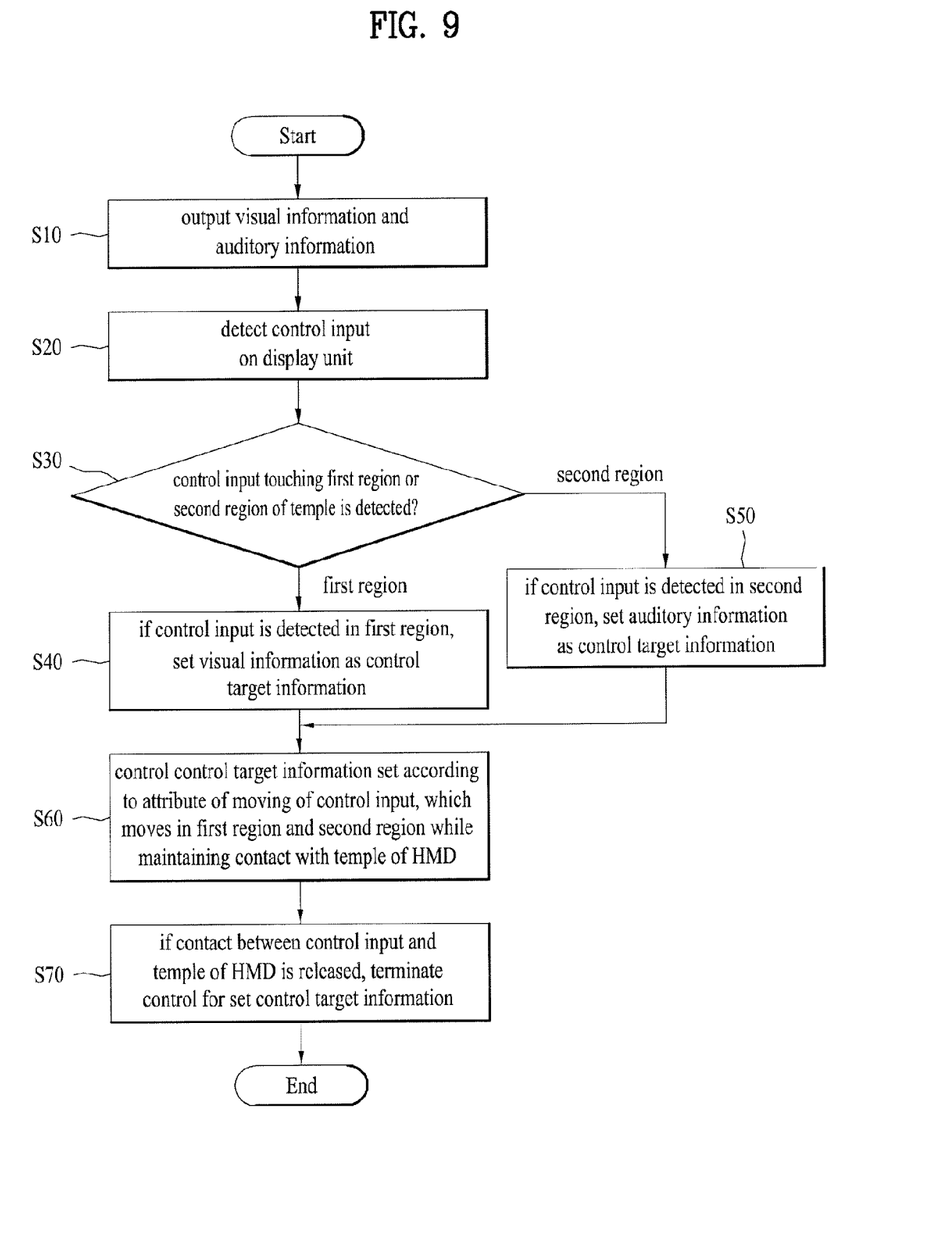
FIG. 9 is an operation flowchart of an HMD according to one embodiment of the present specification.

FIG. 9 is an operation flowchart of an HMD according to one embodiment of the present specification. The HMD can output visual information via the display unit [S10]. As mentioned earlier in FIG. 1 and FIG. 3, the HMD can display the visual information using the display unit included in the display part. The HMD can display video, digital information, an application execution screen, or the like. A user can check displayed visual information by eyes.

The HMD can output auditory information via the audio output unit [S20]. As mentioned earlier in FIG. 1 and FIG. 5, the HMD can output the auditory information using the audio output unit included in the ear piece part. The HMD can output music, alarm, a voice of the other party in case of performing a voice call, or a notification sound. A user can check outputted auditory information by ears of the user.

The HMD can detect a control input touching a first region or a second region of the temple of the HMD [S30]. As mentioned earlier in FIG. 2 to FIG. 5, the HMD can divide the touch sensitive region of the temple part into the first region and the second region. The HMD can set a region adjacent to the display part of the temple part as the first region. And, the HMD can set a region adjacent to the ear piece part of the temple part as the second region. The HMD can detect a control input in the first region or the second region using the sensor unit. The HMD can detect a touch input of a user using a capacitive or a resistive touch sensor.

If a control input is detected in the first region, the HMD can set visual information as control target information [S40]. If a control input is detected in the first region, the HMD can set visual information displayed by the display unit or the visual information capable of being displayed by the display unit as the control target information. The HMD can maintain the set control target information until the contact between the control input and the touch sensitive region of the temple part is released. In particular, the HMD can maintain the visual information as the control target information until the contact of the control input detected in the first region is terminated. Although the control input detected in the first region moves to the second region while maintaining the contact, the HMD can maintain the visual information as the control target information. If the contact between the control input and the touch sensitive region is released, the HMD can reset the control target information when a next control input is inputted. In particular, in case of a first control input, which is detected after the contact is released, if the first control input is detected in the first region, the HMD resets visual information as the control target information. If the first control input is detected in the second region, the HMD can reset auditory information as the control target information.

And, the HMD can generate a tactile feedback for the detected control input in the present step. The HMD generates a first tactile feedback in the first region and may be then able to inform a user that the user controls visual information.

If a control input is detected in the second region, the HMD can set auditory information as control target information [S50]. If a control input is detected in the second region, the HMD can set auditory information outputted by the audio output unit or the auditory information capable of being outputted by the audio output unit as the control target information. The HMD can maintain the set control target information until the contact between the control input and the touch sensitive region of the temple part is released. In particular, the HMD can maintain the auditory information as the control target information until the contact of the control input detected in the second region is terminated. Although the control input detected in the first region moves to the second region while maintaining the contact, the HMD can maintain the visual information as the control target information. If the contact between the control input and the touch sensitive region is released, the HMD can reset the control target information when a next control input is inputted. The HMD generates a second tactile feedback in the second region and may be then able to inform a user that the user controls visual information.

The HMD can control an output of the set control target information according to an attribute of moving of a control input, which moves in the first region and the second region while maintaining a contact with the temple of the HMD [S60]. The HMD controls the output of the set control target information configured in accordance with the attribute of moving of the control input. In this case, the attribute of moving of the control input may include at least one of a moving direction, a speed, and a path of the control input. For instance, if the control target information corresponds to a television program, which is visual information, the HMD can switch a channel of the television program in response to the moving direction of the control input. And, if the control target information corresponds to music, which is auditory information, the HMD can differently apply a changing speed or a changing step of a volume control in response to a speed of the control input.

And, the HMD can generate a tactile feedback for the detected control input in the present step. The HMD can generate a tactile feedback in response to the set control target information. In other word, if the set control target information corresponds to visual information, the HMD can generate a first tactile feedback in response to at least one of a shape, a position, a size, and a texture of the visual information. And, if the set control target information corresponds to auditory information, the HMD can generate a second tactile feedback in response to at least one of a tempo, a volume, and a rhythm of the auditory information.

If the contact between the control input and the temple of the HMD is released, the HMD can terminate a control for an output of the set control target information [S70]. The HMD can detect that the contact between the control input and the touch sensitive region of the temple part is terminated. If the contact is terminated, the HMD can terminate the control for the output of the set control target information. And, if the contact is terminated, the HMD releases the configuration set to the control target information. The HMD can reset the control target information when a next control input is inputted.

As mentioned in the foregoing description, the HMD according to the present specification determines control target information according to a position of a detected control input and may be then able to reset the touch sensitive region according to the determined control target information. By doing so, the HMD can control preferred information using the touch sensitive region including a limited space.

It will be apparent to those skilled in the art that various modifications and variations can be made in the present specification without departing from the spirit or scope of the inventions. Thus, it is intended that the present specification covers the modifications and variations of this invention provided they come within the scope of the appended claims and their equivalents.

What is claimed is:

1. A head mounted display (HMD), comprising:
a display unit configured to output visual information;
an audio output unit configured to output auditory information;
a sensor unit configured to detect a control input on a touch sensitive region by being positioned at a temple of the HMD; and
a controller configured to control an output of control target information according to a region in which the control input is detected in a first region, a second region, or a third region of the touch sensitive region,
wherein the controller is further configured to:
set the visual information as the control target information when the control input is detected in the first region of the sensor unit, and set the auditory information as the control target information when the control input is detected in the second region of the sensor unit,
control an output of the set control target information according to an attribute of moving of the control input, which moves in at least one of the first region, the second region and the third region while maintaining a contact with the sensor unit, and
terminate a control for the output of the set control target information when the contact between the control input and the sensor unit is released,
wherein the first region corresponds to a region adjacent to the display unit of the temple, wherein the second region corresponds to a region adjacent to the audio output unit of the temple and wherein the third region is between the first region and the second region,
wherein when the control input is detected in the first region, the first region is extended to the entire touch sensitive region including the second region and the visual information is controlled by the control input detected in the extended first region while the contact is maintained,
wherein when the control input is detected in the second region, the second region is extended to the entire touch sensitive region including the first region and the auditory information is controlled by the control input detected in the extended second region while the contact is maintained,
wherein when the control input is detected in the third region between the first region and the second region and moves to a first direction at which the first region is positioned while the contact is maintained, the first region is extended to the entire touch sensitive region including the second region and the visual information is set as the control target information, and
wherein when the control input is detected in the third region between the first region and the second region and moves to a second direction at which the second region is positioned while the contact is maintained, the second region is extended to the entire touch sensitive region including the first region and the auditory information is set as the control target information.

2. The HMD of claim 1, wherein the controller is configured to control the output of the set control target information in response to the control input, which moves in the first region, the second region, and the third region, while the contact between the control input and the sensor unit is maintained.

3. The HMD of claim 1, wherein when the visual information is displayed and the auditory information is not outputted, the controller is configured to control the output of the visual information according to the control input detected in the first region or the second region.

4. The HMD of claim 1, wherein when the auditory information is outputted and the visual information is not displayed, the controller is configured to control the output of the auditory information according to the control input detected in the first region or the second region.

5. The HMD of claim 1, wherein when a first control input is detected in the first region or the second region after the contact between the control input and the sensor unit is released, the controller is configured to reset the control target information according to a region in which the first control input is detected.

6. The HMD of claim 1, wherein when the control input is detected in the first region, the controller is configured to set the visual information as the control target information and configured to control at least one of a menu, a movement, a size, a position, and a playback of the visual information according to the attribute of moving of the control input.

7. The HMD of claim 1, wherein when the control input is detected in the second region, the controller is configured to set the auditory information as the control target information and configured to control at least one of a volume, a balance, and a playback of the auditory information according to the attribute of moving of the control input.

8. The HMD of claim 1, wherein the attribute of moving of the control input comprises at least one of a moving direction, a speed, and a path of the control input.

9. The HMD of claim 1, further comprising a tactile feedback unit configured to generate a tactile feedback,
wherein the controller is configured to generate a first tactile feedback in the first region and configured to generate a second tactile feedback in the second region.

10. The HMD of claim 9, wherein when the control input detected in the first region moves to the second region while maintaining the contact with the sensor unit, the controller is configured to generate the first tactile feedback in the first region and the second region, and
wherein when the control input detected in the second region moves to the first region while maintaining the contact with the sensor unit, the controller is configured to generate the second tactile feedback in the first region and the second region.

11. The HMD of claim 9, wherein the controller is configured to generate the first tactile feedback in response to an attribute of the visual information.

12. The HMD of claim 11, wherein the attribute of the visual information comprises at least one of a shape, a position, a size, and a texture of the visual information.

13. The HMD of claim 9, wherein the controller is configured to generate the second tactile feedback in response to an attribute of the auditory information.

14. The HMD of claim 13, wherein the attribute of the auditory information comprises at least one of a tempo, a volume, and a rhythm of the auditory information.

15. The HMD of claim 1, wherein the audio output unit comprises a bone conduction speaker.

16. A method of controlling a head mounted display (HMD), the method comprising:
outputting visual information via a display unit;
outputting auditory information via an audio output unit;
detecting a control input touching a first region, a second region, or a third region of a touch sensitive region of a temple of the HMD;
setting the visual information as control target information when the control input is detected in the first region;

setting the auditory information as the control target information when the control input is detected in the second region;
controlling an output of the set control target information according to an attribute of moving of the control input, which moves in at least one of the first region, the second region and the third region while maintaining a contact with the temple of the HMD; and
terminating a control for the output of the set control target information when the contact between the control input and the temple of the HMD is released,
wherein the first region corresponds to a region adjacent to the display unit of the temple, wherein the second region corresponds to a region adjacent to the audio output unit of the temple and wherein the third region is between the first region and the second region,
wherein when the control input is detected in the first region the first region is extended to the entire touch sensitive region including the second region and the visual information is controlled by the control input detected in the extended first region while the contact is maintained,
wherein when the control input is detected in the third region between the first region and the second region and moves to a first direction at which the first region is positioned while the contact is maintained, the first region is extended to the entire touch sensitive region including the second region and the visual information is set as the control target information, and
wherein when the control input is detected in the third region between the first region and the second region and moves to a second direction at which the second region is positioned while the contact is maintained, the second region is extended to the entire touch sensitive region including the first region and the auditory information is set as the control target information.

* * * * *